Patented Jan. 14, 1936

2,027,908

UNITED STATES PATENT OFFICE 2,027,908

CARBAZOLE DERIVATIVES AND PROCESS OF MAKING SAME

Hermann Hauser, Basel, and Max Bommer, Riehen, near Basel, Switzerland, assignors to the firm Society of Chemical Industry in Basle, Basel, Switzerland No Drawing. Application July 7, 1934, Serial No. 734,208. In Switzerland July 20, 1933

11 Claims. (Cl. 260—46)

It has been found that valuable carbazole derivatives may be produced by treating compounds of the general formula

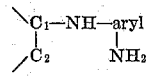

wherein the carbon pair $C_1C_2$ belongs to a polynuclear radical capable of being vatted in which at least one carbon atom standing in ortho-position to the imino-group is unsubstituted, and in which the amino-group is in ortho-position to the imino-group, with diazotizing agents, and heating the azimides thus obtained.

The carbon pair $C_1C_2$ may belong for example to an anthanthrone, dibenzpyrenequinone, dibenzanthrone, indigo or thio-indigo radical. It may particularly also belong to an anthraquinone radical whose 1- or 2-position is connected with the imino-group, and which is substituted by halogens, alkyl-, nitro-, alkoxy- or by aroylamino-groups, such as, for example, benzoylamino-groups which may for instance be in 4-, 5- or 8-position.

The aryl radical may for instance be a benzene, naphthalene or anthracene radical, and these radicals may contain various substituents, such as, for example, halogens (among others chlorine and bromine), or alkoxy-groups (among others methoxy- and ethoxy groups), or nitro- or acylamino-groups (among others acetyl- and benzoylamino-groups), or alkyl-groups.

The compounds having the above general formula, and which serve as parent materials for the present process, may be made by reducing the corresponding nitro-compounds, for instance with sodium hydrosulfite or with zinc, in alkaline solution.

The diazotization of the compounds of the above general formula may be conducted in the usual manner very smoothly, for instance by treating the parent material in an aqueous medium and in presence of mineral acid with alkali nitrite (sodium or potassium nitrite). But the diazotization may also be carried out with use of nitrosylsulfuric acid. There are thus probably produced the corresponding azimides of the general formula

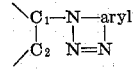

wherein the carbon pair $C_1C_2$ belongs to a polynuclear radical capable of being vatted. These azimides, when heated to a high temperature in the absence or preferably in the presence of organic solvents, such as for example dichlorbenzene, nitrobenzene, naphthalene, chlornaphthalene or chlornitrobenzene, as well as in presence of organic bases, such as for instance dimethylaniline, diethylaniline, diphenylamine, quinoline or methylquinoline, split off nitrogen and pass into the corresponding carbazole derivatives.

These carbazole derivatives are in themselves already valuable vat-dyestuffs, or they constitute intermediate products for making new vat-dyestuffs. By the action of halogenating agents, for example chlorine, sulfurylchloride and bromine, preferably in the presence of the organic solvents mentioned above, or in a concentrated sulfuric acid solution, they may be converted into further valuable intermediate products, or in many cases into vat-dyestuffs of a still more improved fastness. The carbazole derivatives obtainable according to the present process may be further purified, if desired, in the usual manner, for example by crystallization or by treatment with oxidizing agents, such as hypochlorite, or by conversion into their salts by means of strong mineral acid. By the usual methods they can be converted into their leuco-derivatives, for instance, the leuco-sulfuric acid esters.

Particularly valuable are the carbazole derivatives of the general formula

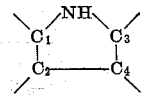

wherein the carbon pair $C_1C_2$ belongs to an anthraquinone radical substituted by a benzoylamino-group and the carbon pair $C_3C_4$ belongs to an aryl radical whose carbon atom standing in para-position to the imino-group is unsubstituted. These carbazole derivatives may for instance be obtained in the following manner: 1- or 2-amino-anthraquinones which are substituted for example in the 4-, 5- or 8-position by benzoylamino-groups, are caused to react with ortho-nitrohalogenbenzenes or naphthalenes whose carbon atom standing in para-position to the amino-group is unsubstituted. In the bodies formed the nitro-group is reduced and the amine thus obtained converted into the corresponding azimide by diazotization. From these azimides the carbazoles of the above general formula are obtained by heating to the high temperature in the already indicated manner.

If desired, they may be treated with halogenating agents in the manner also already indicated, and constitute olive to brown to red to yellow colored powders which dissolve in concentrated sulfuric acid to blue-green to green solutions, and dye cotton from the vat olive to brown to red to yellow tints of very good fastness properties.

The following examples illustrate the invention, the parts being by weight:—

*Example 1*

120 parts of ortho'-nitranilinoanthraquinone of the formula

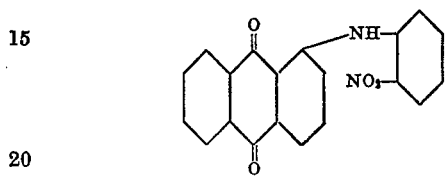

obtainable, for example, by treating 1-aminoanthraquinone with ortho-nitrochlorobenzene according to Ullmann & Fodor (Annalen, Vol. 380, page 327), are made into a paste with a small quantity of spirit and this paste is mixed with 2000 parts of water at about 60° C. While stirring, there are added 800 parts of caustic soda solution of 30 per cent. strength and then there are strewn in 360 parts of sodium hydrosulfite. The whole is kept for ½ hour at 50–60° C. and is then oxidized by means of air. The ortho'-amino-anilino-compound of the formula

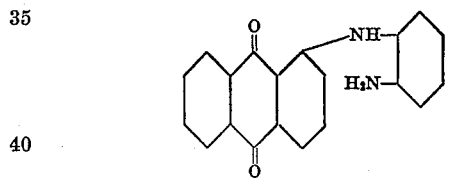

is stirred with 2000 parts of water, 100 parts of commercial concentrated hydrochloric acid are added and stirring is continued for some time. The mixture is now cooled with ice and a solution of sodium nitrite, corresponding with a content of 30 parts of sodium nitrite, is gradually added. The whole is heated to boiling and filtered. 50 parts of the azimino-compound of the formula

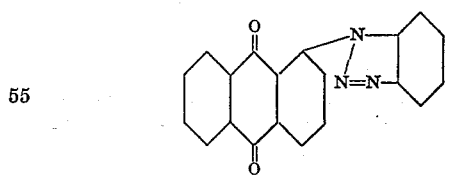

thus produced, 250 parts of nitrobenzene and 50 parts of diethylaniline are together heated to boiling until the parent material has disappeared. On cooling, 1:2-phthaloylcarbazole of the formula

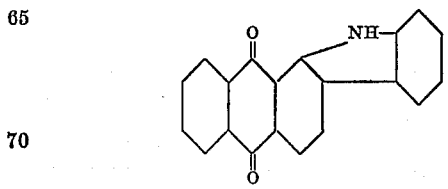

crystallizes in the form of orange crystals, which dissolve in concentrated sulfuric acid to a blue solution.

*Example 2*

89 parts of 1-aminoanthraquinone, 100 parts of nitro-para-dichlorobenzene, 60 parts of calcined sodium carbonate, 1 part of copper acetate, 1 part of copper powder and 600 parts of nitrobenzene are mixed together and the mixture is heated to boiling, while stirring, for 6–12 hours. The mass is allowed to cool while stirring is continued, then filtered by suction and the solid matter treated with dilute acid to separate the inorganic constituents. The product thus obtained of the formula

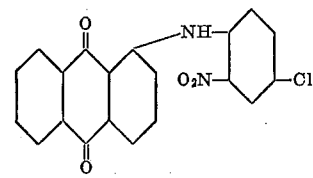

has a melting point above 300° C. By reducing it with caustic soda solution and sodium hydrosulfite there is obtained the corresponding amino-compound in the form of a blue-violet powder and from this the azimino-compound is produced in manner analogous to that described in Example 1. From this, by boiling for a short time with diphenylamine, the corresponding chlorophthaloylcarbazole of the formula

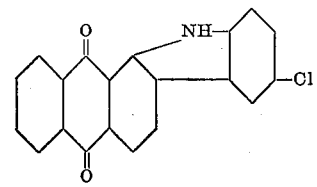

is produced. This dissolves in concentrated sulfuric acid to a pure blue solution and melts at 303° C., after it has been once recrystallized from nitrobenzene.

*Example 3*

40 parts of the chlorophthaloylcarbazole produced as described in Example 2 are suspended in 400 parts of nitrobenzene and, at a temperature of 95–100° C., there are dropped into the suspension a mixture of 80 parts of bromine and 200 parts of nitrobenzene. The whole is kept for 2 hours at the said temperature and the well crystallized product of the reaction is filtered cold. It dissolves in concentrated sulfuric acid to a red-violet solution. Cotton is dyed in a vat of the product pure and fast yellow tints, whereas the parent material yields orange dyeings which are not clear and not fast to washing.

*Example 4*

21 parts of 4-amino-1:1' anthrimide of the formula

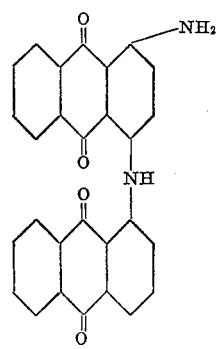

20 parts of ortho-nitrochlorobenzene, 10 parts of calcined sodium carbonate, 1 part of copper acetate, 1 part of copper powder and 160 parts of nitrobenzene are boiled together for 12 hours, while stirring. The product of the formula

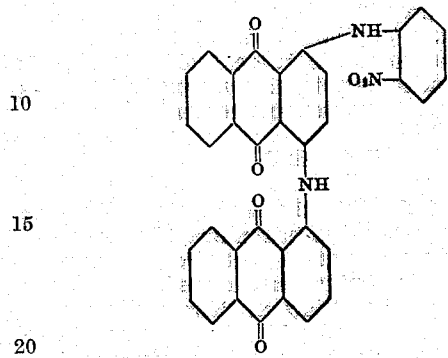

is filtered when cold and freed from inorganic constituents by treatment with dilute mineral acid. The product crystallizes in small needles; it is reduced in the manner described in Example 1, diazotized with sodium nitrite and then heated to boiling with diphenylamine for a short time. The product thus obtained of the formula

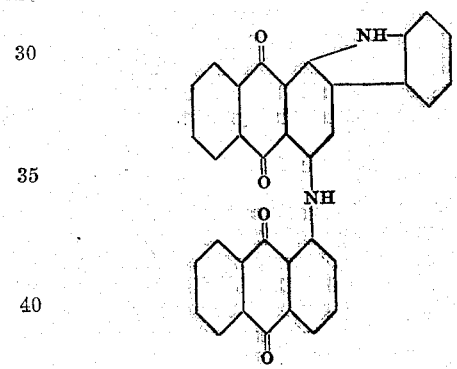

dissolves in concentrated sulfuric acid to an olive solution, yields a black-brown vat and dyes grey.

*Example 5*

28 parts of 1-amino-4'-benzoylamino-8:1'-anthrimide of the formula

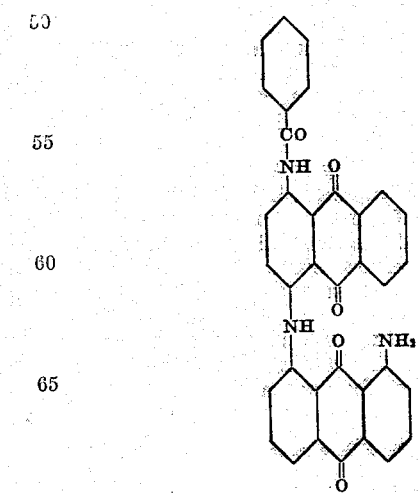

(obtainable by the reaction of 1-toluene-sulfamino-8-chloroanthraquinone with 1:4-monobenzoyl-diaminoanthraquinone and splitting off the toluene-sulfo-residue by treatment with concentrated sulfuric acid at 0-10° C.) are mixed with 12 parts of ortho-nitrochlorobenzene, 10 parts of calcined sodium carbonate, 1 part of copper powder, 1 part of copper acetate and 300 parts of nitrobenzene, and the mixture is stirred and heated to boiling for 12 hours. The product thus obtained of the formula

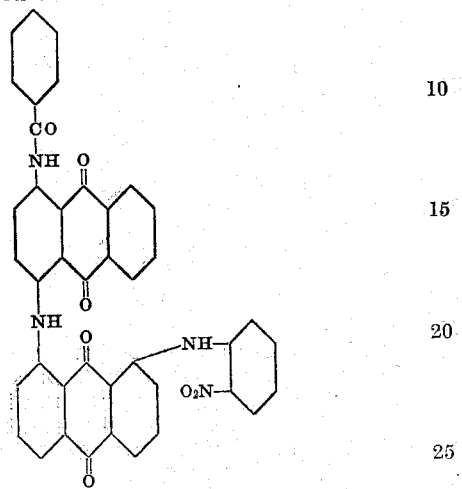

is filtered cold and reduced in the manner described in Example 4, and then diazotized and heated with diphenylamine. The product thus obtained of the formula

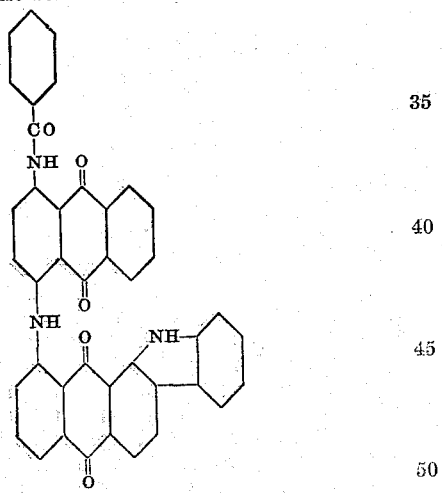

dissolves in concentrated sulfuric acid first to a dark brown solution, the color of which passes rapidly to reddish brown. When precipitated from concentrated sulfuric acid the dyestuff dyes cotton grey.

*Example 6*

97 parts of 1-chloranthraquinone, 76 parts of meta-nitro-para-anisidine, 60 parts of calcined sodium carbonate, 1 part of copper acetate, 1 part of copper bronze and 500 parts of nitro-benzene are mixed together and the mixture boiled, while stirring, for 6 hours. The product is filtered cold and reduced in manner analogous to that described in Example 2; it is then diazotized and converted into the carbazole derivative of the formula

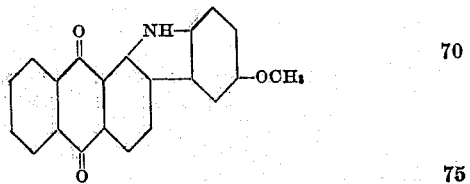

Example 7

68 parts of 1:4-monobenzoyl-diaminoanthraquinone of the formula

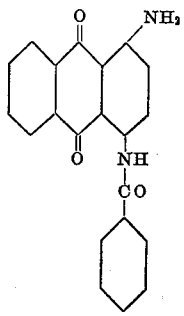

40 parts of ortho-nitrochlorobenzene, 20 parts of calcined sodium carbonate, 1 part of copper acetate, 1 part of copper bronze and 500 parts of nitrobenzene are mixed together and the mixture heated to boiling while stirring for 10–18 hours. The product of the formula

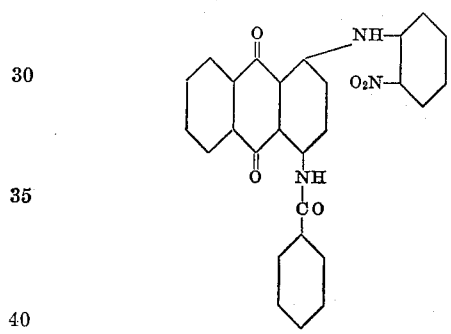

separates in the form of dark needles and is filtered cold. It dissolves in concentrated sulfuric acid to a green solution and melts at 248–249° C. By reduction with aqueous, alkaline hydrosulfite solution it yields the corresponding amino-compound, which when diazotized in aqueous suspension in manner analogous to that described in Example 1 is converted into the yellow azimino-compound. The latter crystallizes from pyridine in yellow prisms and melts at 260–261° C. 10 parts of it are mixed with 5 parts of diethylaniline and 50 parts of nitrobenzene and the mixture is heated to boiling for 4 hours, while stirring. On cooling, the product of the formula

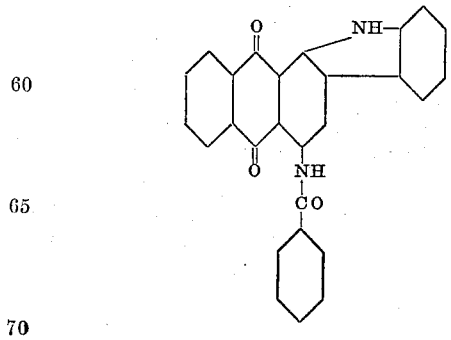

separates in the form of small olive needles. It dissolves in concentrated sulfuric acid to a blue-green solution and dyes cotton in a red-orange vat strong olive tints, of very good properties of fastness.

Example 8

89 parts of 1,2-phthaloylcarbazole obtained as described in Example 1 are suspended in 630 parts of nitrobenzene. 5 parts of iodine are now added and at 150–160° C. 300 parts of bromine are allowed to drop in. At this temperature stirring is continued for 3 hours. The product crystallizes in needles and is filtered cold. In sulfuric acid-monohydrate it dissolves gradually to a violet solution. The bromine content amounts to 51.5 per cent.

Example 9

36 parts of 1,5-chlorobenzoyl-aminoanthraquinone, 15 parts of ortho-nitraniline, 15 parts of calcined sodium carbonate, 1 part of copper acetate and 300 parts of nitrobenzene are heated together to boiling for 12 hours. The product is filtered cold and washed with nitrobenzene, alcohol and water. It dissolves in concentrated sulfuric acid to a yellow solution. By reaction with alkali hydrosulfite there is obtained the corresponding amino-compound. By treating this with a diazotizing agent in the manner described in Example 1 there is obtained the corresponding azimino-compound. This can easily be converted into the corresponding carbazole derivative by boiling a mixture of it with nitrobenzene in presence of diethylaniline. The carbazole derivative dissolves in concentrated sulfuric acid to a green to blue-green solution. The vat of the dyestuff dyes cotton strong and fast yellow-brown tints.

Example 10

21 parts of the benzoylaminophthaloylcarbazole, obtainable as described in Example 7, 2 parts of iodine and 250 parts of nitrobenzene are heated together to 90–100° C. At this temperature there is added a mixture of 30 parts of bromine and 50 parts of nitrobenzene in drops and the whole is then maintained for about 2 hours at the previously named temperature. The mass is allowed to cool and the bromination product, which is formed in the shape of small needles, is filtered. The red vat of the dyestuff dyes cotton strong and fast bordeaux tints.

Example 11

15 parts of 1,2-phthaloylcarbazole, obtainable as described in Example 1, are mixed with 150 parts of nitrobenzene and at a temperature of 50–60° C. there is added by drops a mixture of 4 parts of concentrated nitric acid and 20 parts of nitrobenzene. Heating is continued for half an hour at 90–100° C., the whole is then somewhat cooled and 100 parts of nitrobenzene are added, followed by filtration of the product which has crystallized in small needles. In concentrated sulfuric acid it dissolves to a blue violet solution.

What we claim is:—

1. Process for the production of carbazole derivatives, consisting in treating with diazotizing agents compounds of the general formula

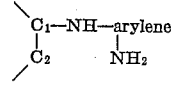

wherein the carbon pair $C_1C_2$ belong to an anthraquinone radical in which at least one carbon atom standing in ortho-position to the imino-group is unsubstituted and in which the amino-group is in ortho-position to the imino-group, and heating the azimides thus formed.

2. Process for the production of carbazole derivatives, consisting in treating with diazotizing agents compounds of the general formula

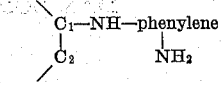

wherein the carbon pair $C_1C_2$ belongs to an anthraquinone radical in which at least one carbon atom standing in ortho-position to the imino-group is unsubstituted and in which the amino-group is in ortho-position to the imino-group, and heating the azimides thus formed.

3. Process for the production of carbazole derivatives, consisting in treating with diazotizing agents compounds of the general formula

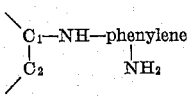

wherein the carbon pair $C_1C_2$ belongs to an anthraquinone radical in which at least one carbon atom standing in ortho-position to the imino-group is unsubstituted and in which the amino-group is in ortho-position to the imino-group, then heating the azimides thus formed, and finally causing halogenating agents to react with the carbazole derivatives so obtained.

4. Process for the production of carbazole derivatives, consisting in treating with diazotizing agents compounds of the general formula

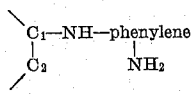

wherein the carbon pair $C_1C_2$ belongs to an anthraquinone radical in which at least one carbon atom standing in ortho-position to the imino-group is unsubstituted and in which the amino-group is in ortho-position to the imino-group, and heating the azimides thus formed in the presence of organic solvents.

5. Process for the production of carbazole derivatives, consisting in treating with diazotizing agents compounds of the general formula

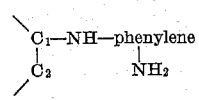

wherein the carbon pair $C_1C_2$ belongs to an anthraquinone radical in which at least one carbon atom standing in ortho-position to the imino-group is unsubstituted and in which the amino-group is in ortho-position to the imino-group, and heating the azimides thus formed in the presence of organic solvents as well as organic bases.

6. Process for the production of carbazole derivatives, consisting in treating with diazotizing agents compounds of the general formula

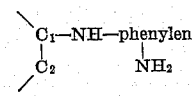

wherein the carbon pair $C_1C_2$ belongs to an anthraquinone radical which is substituted by a benzoylamino-group and in which at least one carbon atom standing in ortho-position to the imino-group is unsubstituted and in which further the amino-group is in ortho-position to the imino-group, and heating the azimides thus formed in the presence of organic solvents as well as organic bases.

7. Process for the production of carbazole derivatives, consisting in treating with diazotizing agents compounds of the general formula

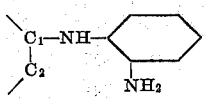

wherein the carbon pair $C_1C_2$ belongs to an anthraquinone radical which is substituted by a benzoylamino-group and in which at least one carbon atom standing in ortho-position to the imino-group is unsubstituted, and heating the azimides thus formed in the presence of organic solvents as well as organic bases.

8. Process for the production of a carbazole derivative, consisting in treating the compound of the formula

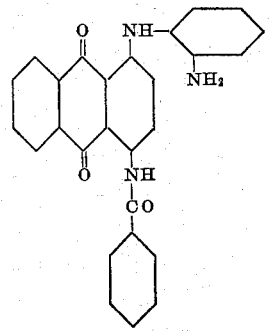

with diazotizing agents and heating the azimide thus formed in the presence of organic solvents as well as organic bases.

9. Carbazole derivatives of the general formula

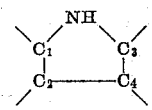

wherein the carbon pair $C_1C_2$ belongs to an anthraquinone radical substituted by a benzoylamino-group and the carbon pair $C_3C_4$ belongs to an aryl radical whose carbon atom standing in para-position to the imino-group is unsubstituted, which products constitute olive to brown to red to yellow colored powders which dissolve in concentrated sulfuric acid to blue-green to green solutions, and dye cotton from the vat olive to brown to red to yellow tints of very good fastness properties.

10. Carbazole derivatives of the general formula

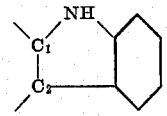

wherein the carbon pair $C_1C_2$ belongs to an anthraquinone radical substituted by a benzoylamino-group, which products constitute olive to brown to red to yellow colored powders which dissolve in concentrated sulfuric acid to blue-green to green solutions, and dye cotton from the vat olive to brown to red to yellow tints of very good fastness properties.

11. The carbazole derivative of the formula

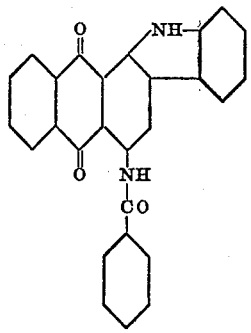

which product constitutes an olive colored powder which dissolves in concentrated sulfuric acid to a blue-green solution, and dyes cotton from a red-orange vat olive tints of very good fastness properties.

HERMANN HAUSER.
MAX BOMMER.